United States Patent
Venkataraman et al.

(10) Patent No.: US 7,990,781 B1
(45) Date of Patent: Aug. 2, 2011

(54) WRITE STROBE GENERATION FOR A MEMORY INTERFACE CONTROLLER

(75) Inventors: Srinivas Venkataraman, Santa Clara, CA (US); Praveen Garapally, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 92 days.

(21) Appl. No.: 12/489,770

(22) Filed: Jun. 23, 2009

(51) Int. Cl.
*G11C 7/00* (2006.01)

(52) U.S. Cl. ..... 365/193; 365/191; 365/194; 365/233.1; 365/233.11; 365/233.14; 365/233.5

(58) Field of Classification Search .................. 365/193, 365/189.16, 191, 194, 233.1, 233.11, 233.14, 365/233.16, 233.18, 233.13, 233.5
See application file for complete search history.

(56) References Cited

U.S. PATENT DOCUMENTS

| | | | | |
|---|---|---|---|---|
| 6,115,322 A | * | 9/2000 | Kanda et al. | 365/233.14 |
| 6,519,188 B2 | * | 2/2003 | Ryoo et al. | 365/189.05 |

* cited by examiner

*Primary Examiner* — Hoai V Ho
*Assistant Examiner* — Kretelia Graham
(74) *Attorney, Agent, or Firm* — Harrity & Harrity, LLP

(57) ABSTRACT

A memory controller includes a circuit to generate a strobe signal for write operations to a DDR SDRAM. The circuit efficiently generates a glitch free strobe signal for a group of data lines. In one implementation, the memory controller includes a write data generation circuits to each transmit a data signal to the memory on a data line, the write data generation circuits being controlled by write enable signals. A write strobe generation circuit generates the strobe signal and the write enable signals, the strobe signal including a preamble window to signal the beginning of the data burst, a data transfer window, and a postamble window to signal the end of the data burst, the write strobe generation circuit generating the write enable signals a half memory cycle early and terminating the write enable signals a half memory cycle late with respect to the data signals generated by the write data generation circuits.

17 Claims, 6 Drawing Sheets

WRITE STROBE GENERATION FOR A MEMORY INTERFACE CONTROLLER

BACKGROUND

Random access memory (RAM) is a type of storage for computing devices. RAM is typically associated with volatile memory that is implemented in integrated circuits and in which stored information is lost when power provided to the RAM is switched off.

One type of RAM is known as DDR SDRAM (double-data-rate synchronous dynamic random access memory). DDR SDRAM is typically used in computing applications that require high bandwidth and low latency memory access. One version of this memory technology is known as DDR3 SDRAM, which can provide for high performance data rates, high bandwidth, high density, and low power consumption relative to earlier generations of SDRAM.

The high bandwidth and high operating frequencies required to drive DDR SDRAM can be problematic as they can make the controller to memory interface electrically complex due to signal integrity considerations. A DDR3 SDRAM controller and associated memory may perform read and write operations synchronously based on a periodic signal transmitted over a "strobe" line. Static and dynamic timing variations between the strobe line and a data line can cause memory errors. Static variations that cause timing skew between the strobe and data lines may be due to, for example, on-die process and wire variations across strobe and data logic, on-chip power supply grid variations, package and board interconnect, and material variations. Dynamic timing variations may be caused by short or long term voltage drift and temperature changes during functional operation of the interface The strobe line may be used to signal the beginning and end of burst of data being written to or read from the DDR3 SDRAM. A "preamble cycle" may be used to indicate the beginning of a write or read burst of a data transfer between controller and memory. A "postamble cycle" may be used to signal the end of a write or read burst of a data transfer between controller and memory. For high frequency memory operation, generation of the write preamble and postamble cycles are not trivial as the cycles should be initiated without causing glitches or false edges from propagating to the memory, which could potentially cause incorrect interpretation of a value being written.

SUMMARY

One aspect described herein is directed to a device comprising a memory configured to store data and a memory controller connected to the memory via a number of data lines for writing a burst of data as a plurality of data signals, and a strobe line, for transmitting a strobe signal used to control writing of the data signals to the memory. The memory controller may include write data generation circuits to each transmit one of the data signals on one of the data lines, the write data generation circuits being controlled by write enable signals. The memory controller may further include a write strobe generation circuit to generate the strobe signal and the write enable signals, the strobe signal including a preamble window to signal the beginning of the data burst, a data transfer window, and a postamble window to signal the end of the data burst, the write strobe generation circuit generating the write enable signals a half memory cycle early and terminating the write enable signals a half memory cycle late with respect to the data signals generated by the write data generation circuits.

Another aspect is directed to a memory controller that includes write data generation circuits to each transmit a data signal to a memory device, the write data generation circuits being controlled by a write enable signal. A write strobe generation circuit transmits the write enable signal to the plurality of write data generation circuits and a strobe signal to the memory device, the strobe signal signaling when data from the data signal should be sampled by the memory device. The strobe signal may include a preamble window to signal the beginning of a write data burst, a data transfer window, and a postamble window to signal the end of the write data burst. The write strobe generation circuit may further include logic to generate a first signal that includes the preamble window, the data transfer window, and the postamble window; a buffer to receive the first signal; and logic to generate a drive enable signal that is input to the buffer, the drive enable signal controls the buffer to source either a tri-state condition or the first signal to an output pad, where the output pad sources the strobe signal to the memory device.

In yet another aspect, a memory controller may include write data generation circuits to each generate a data signal to a memory device, each of the write data generation circuits being controlled by a write enable signal. A write strobe generation circuit may transmit a strobe signal to the memory device. The write strobe generation circuit may further include logic to generate a first signal that defines portions of the strobe signal, a buffer to receive the first signal, and logic to generate a drive enable signal that is input to the buffer, the drive enable signal controls the buffer to source either a tri-state condition or the first signal to an output pad, where the output pad sources the strobe signal to the memory. The write strobe generation circuit may further include logic to generate the write enable signal for the plurality of write data generation circuits, where the logic to generate the write enable signal generates the write enable signal a half memory cycle early and terminates the write enable signals a half memory cycle late with respect to the data signals generated by the write data generation circuits.

BRIEF DESCRIPTION OF THE DRAWINGS

The accompanying drawings, which are incorporated in and constitute a part of this specification, illustrate one or more embodiments described here and, together with the description, explain these embodiments. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a memory controller may include circuitry for writing data to DDR SDRAM memory. The data may be written as a burst of data in which the beginning and end of the burst are signaled by a preamble signal and a postamble signal, respectively. The memory controller may include a circuit to generate a strobe signal for write operations to the DDR SDRAM. The circuit may efficiently generate a glitch free strobe signal for a group of data lines.

Exemplary System Overview

Figure 1:
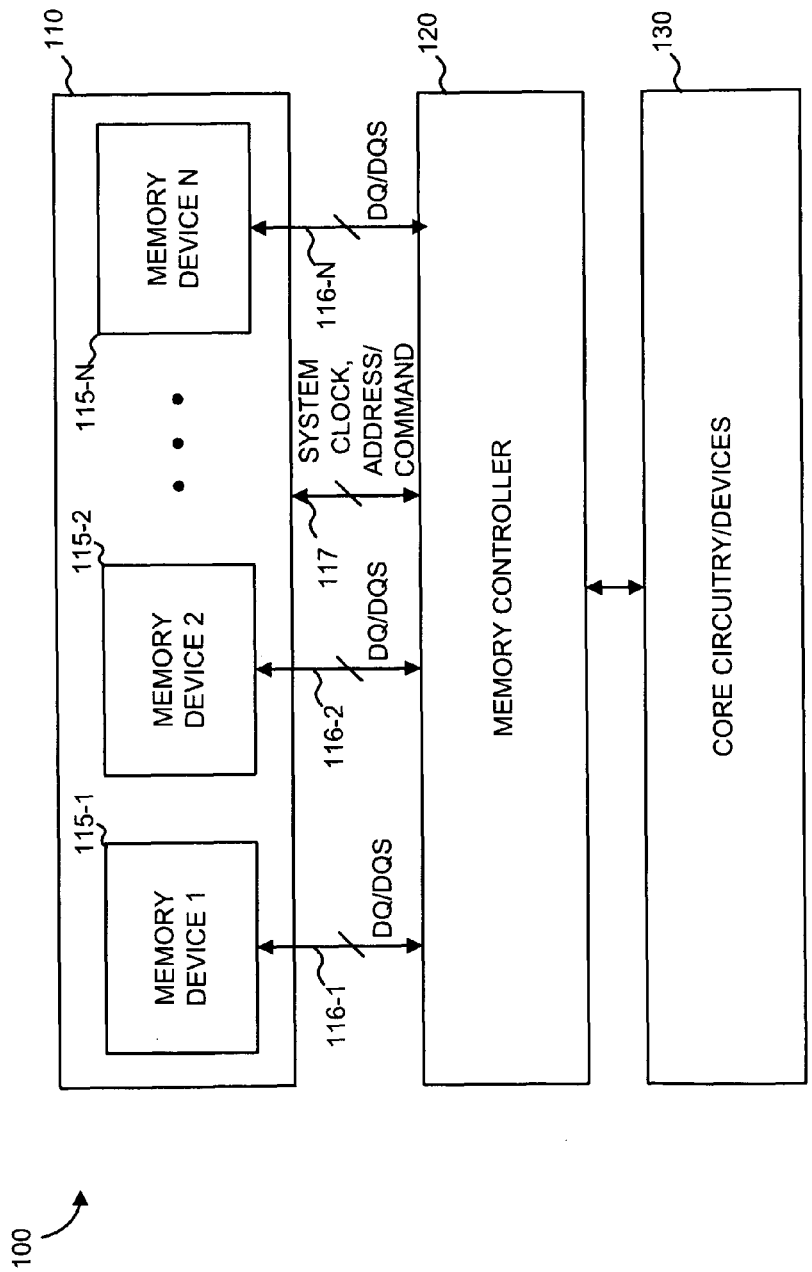
FIG. 1 is a diagram of an exemplary computing system in which concepts described herein may be implemented.

FIG. 1 is a diagram of an exemplary computing system 100 in which concepts described herein may be implemented. Computing system 100 may include a computing device that incorporates random access memory, such as DDR3 SDRAM. For instance, computing system 100 may include an ASIC (application specific integrated circuit), a FPGA (field-programmable gate array), or a circuit board that is designed to perform various functions. For example, computing system 100 may embody or be a part of a network device, such as a router, a switch, a gateway, etc. Computing system 100 may include one or more components or devices that need access to a fast random access memory.

As shown in FIG. 1, computing system 100 may include a memory module 110, a memory controller 120, and core circuitry/devices 130. Memory module 110 may include memory devices 115-1 through 115-N (collectively, memory devices 115). Memory devices 115 may each include, for instance, a memory such as a DDR3 SDRAM memory. In some implementations, memory module 110 may be implemented using one or more stand-alone memory devices 115. In other words, memory devices 115 may be directly connected to memory controller 120 and there may not be any physical "module" that includes the memory devices 115.

Memory controller 120 may read and write data with memory devices 115 of memory module 110. Memory controller 120 may present a single interface through which core circuitry/devices 130 can interact to store and retrieve data. Memory controller 120 may logically present the multiple memory devices 115 to core circuitry/devices 130 as a single storage space that has a capacity equal to the sum of the memory capacities of each of memory devices 115.

Memory controller 120 may read from or write data to memory module 110 using a number of data (DQ) and strobe (DQS) lines connected to each memory device 115. DQ/DQS sets 116-1 through 116-N are particularly shown in FIG. 1. Each DQ/DQS set 116 may include, for example, eight data (DQ) lines and a corresponding strobe (DQS) line. Data may be read and received with the corresponding memory device 115 in which data bits are synchronously transmitted based on the state of the DQS line. For DDR memory, for instance, data is typically "double pumped" by latching (sampling) the data on the rising and falling edges of the strobe signal. Memory controller 120 may also connect to memory module 110 using additional control and clock lines, labeled as system clock, address/command lines 117 in FIG. 1.

Core circuitry/devices 130 may include specialized circuits, general purpose processors or microprocessors, or other computing devices that connect to memory controller 120. Through memory controller 120, core circuitry/devices 130 may access memory module 110.

Figure 2:
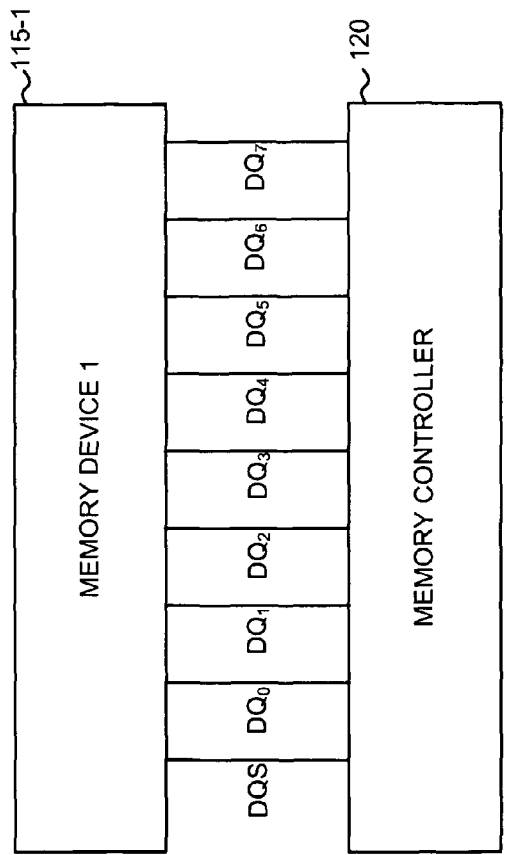
FIG. 2 is a diagram illustrating an exemplary implementation of a memory device and the memory controller shown in FIG. 1.

FIG. 2 is a diagram illustrating an exemplary implementation of memory device 115-1 and memory controller 120. In this example, eight DQ lines $DQ_0$ through $DQ_7$ connect memory device 115-1 and memory controller 120. DQ lines $DQ_0$ through $DQ_7$ may each correspond to lines used to transmit and receive data bits. As shown, memory device 115-1 may transmit or receive one or more byte (eight bit) groups. Each byte may have its own DQS line. Timing for each of lines $DQ_0$ through $DQ_7$ may be controlled via the DQS line (i.e., the strobe signal). Memory devices 115-2 through 115-N may be similarly connected to memory controller 120.

Figure 3:
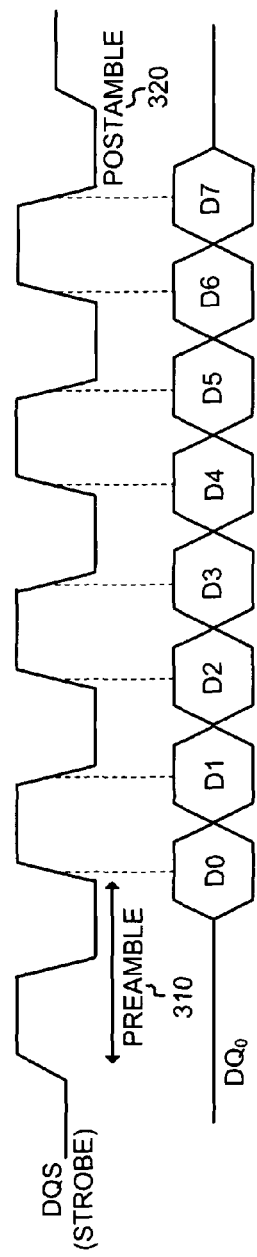
FIG. 3 is an exemplary timing diagram illustrating exemplary interaction between the DQ and DQS lines shown in FIG. 2.

FIG. 3 is a timing diagram illustrating exemplary interaction between the DQ and DQS lines shown in FIG. 2 for a write operation from memory controller 120 to memory device 115-1. A single DQ line, $DQ_0$, is shown in FIG. 2. Data for eight bits (labeled D0 through D7) are shown, at different times, on DQ0. Each successive bit may be transmitted on $DQ_0$ on both the rising and falling edges of DQS. Further, a preamble window 310 and a postamble window 320 are shown on the DQS line.

Preamble window 310 may be used by memory controller 120 to signal the beginning of a write cycle. The DQS line may initially be in a tri-state (high impedance state). Memory controller 120 may take the DQS line from tri-state to logic high and then to logic low, each for half a clock cycle, to transmit preamble window 310. In response, memory device 115-1 should recognize the preamble window and, when the DQS line transitions to a second logic high state, begin sampling data for writing to memory 115-1. Postamble window 320 signals the end of a data cycle. Memory control 120 may hold the DQS line at a logic low level for a half cycle period to implement postamble window 320, before placing the DQS line into a tri-state mode. Memory device 115-1 may sample the incoming data during a data sample window defined as the time between preamble window 310 and postamble window 320.

DQS Write Circuitry

Figure 4:
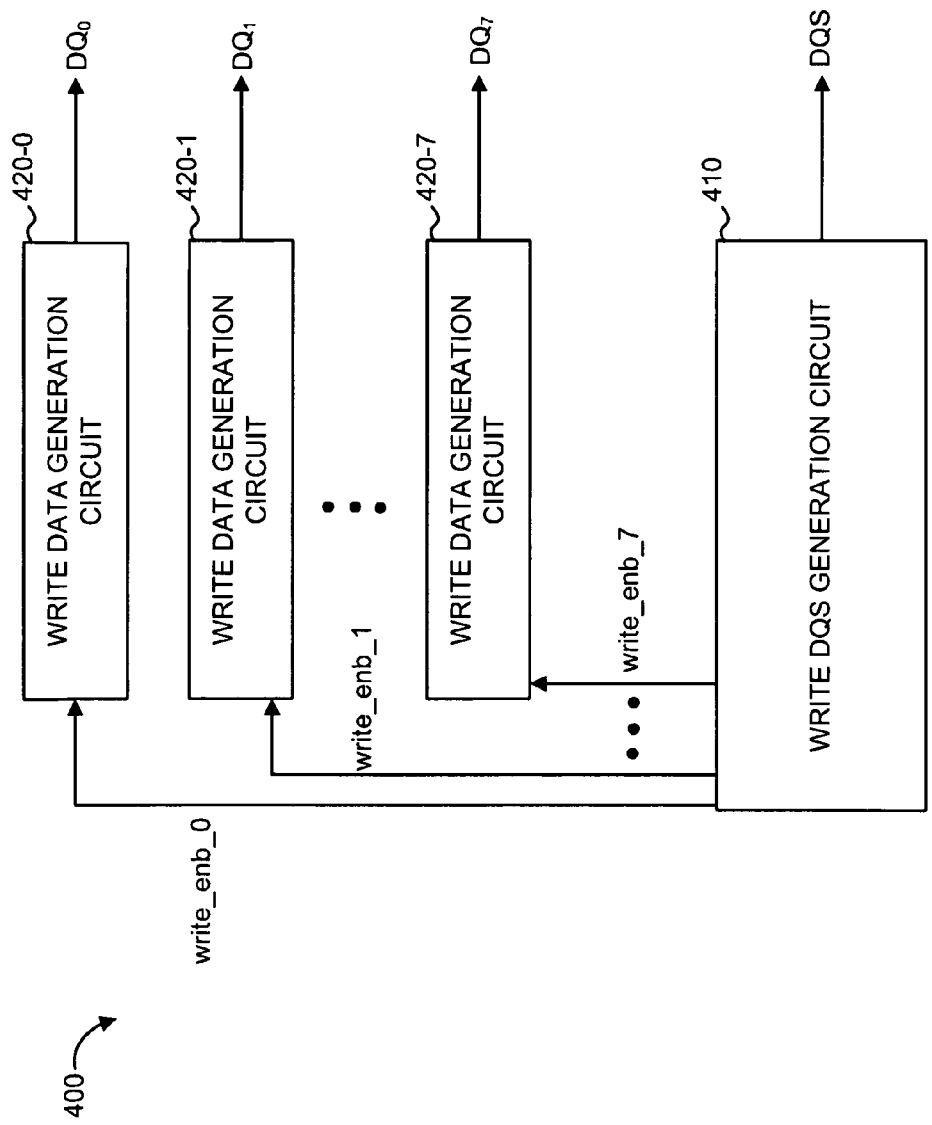
FIG. 4 is a block diagram illustrating an exemplary system for writing data to a memory module or device.

FIG. 4 is a block diagram illustrating an exemplary system 400 for writing data to memory module 110. System 400 may be implemented in memory controller 120. In one implementation, a copy of system 400 may be implemented in memory controller for each connected memory device 115-1 through 115-N. System 400 may generally operate to generate the DQS signal, including the write preamble and postamble signals. System 400 may additionally source the data that is to be written on $DQ_0$ through $DQ_7$ so that that data is synchronized to correspond to the rising and falling edges of the DQS signal.

As shown, system 400 may include a write DQS generation circuit 410 and a plurality of write data generation circuits 420-0 through 420-7. Write DQS generation circuit 410 may generate the DQS signal for a write operation to a memory device 115 in memory module 110. Write DQS generation circuit 410 may also generate enable signals, labeled as signals write_enb_0 through write_enb_7, that are input to write data generation circuits 420-0 through 420-7, respectively. Write data generation circuits 420-0 through 420-7 may correspond to circuits that source the data that is to be written to DQ lines $DQ_0$ through $DQ_7$, respectively.

Figure 5:
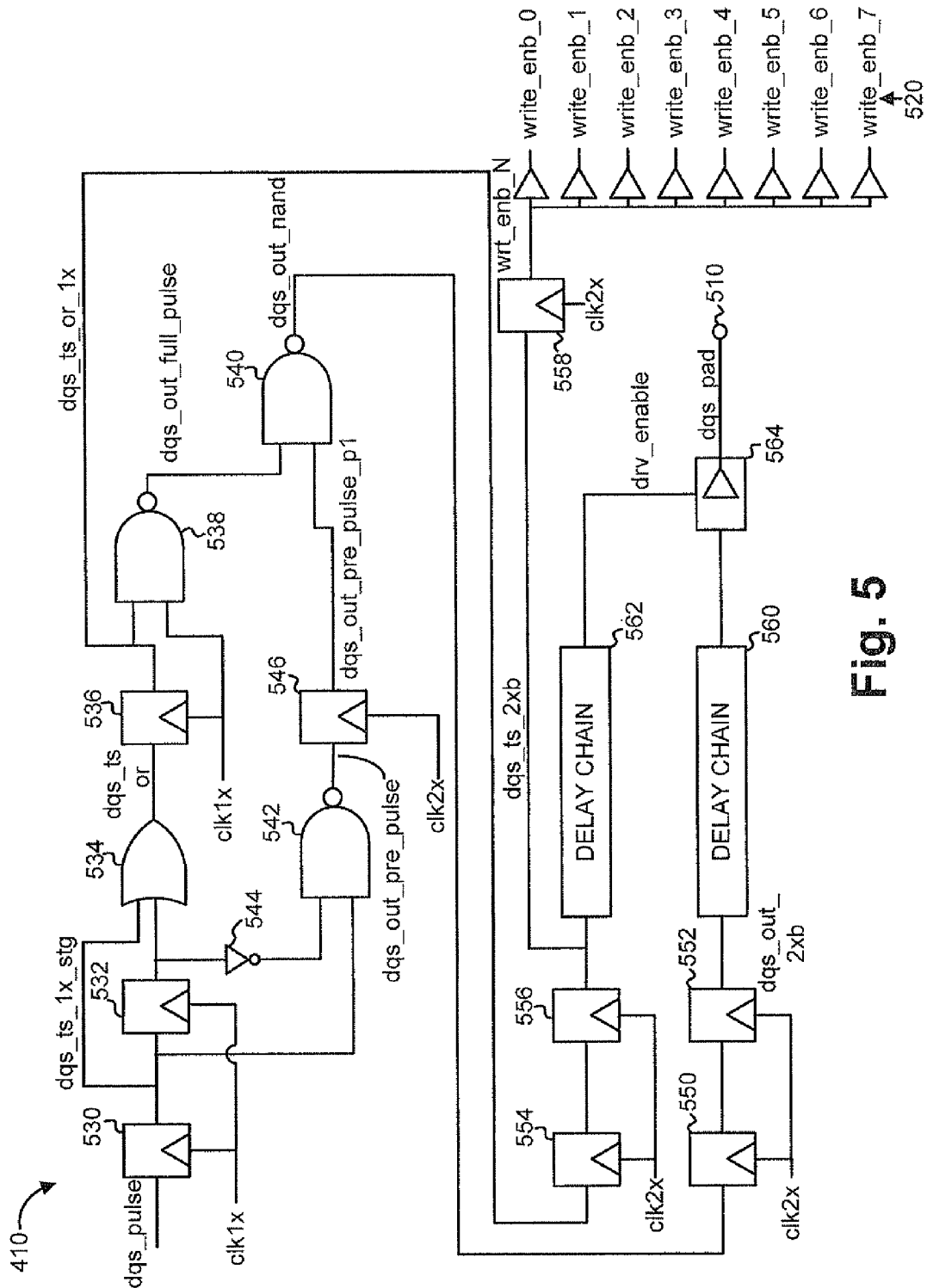
FIG. 5 is a diagram illustrating an exemplary implementation of the write DQS generation circuit shown in FIG. 4.

FIG. 5 is a diagram illustrating an exemplary implementation of write DQS generation circuit 410. Write DQS generation circuit 410 may include a number of flip-flops, logic gates, and other elements that operate to, based on an initial signal, generate a DQS write signal such as the DQS signal shown in FIG. 3 More particularly, write DQS generation circuit 410 may receive a signal "dqs_pulse," which may correspond to a signal that is driven logic high for four clock cycles. The logic in write DQS generation circuit 410, based on input clock signals clk1x and clk2x, operates to output the DQS signal at output pad 510 and output write enable signals 520 to each of write data generation circuits 420-0 through 420-7.

As is particularly shown in FIG. 5, write DQS generation circuit 410 may include flip-flops 530 and 532. Flip-flops 530 and 532 may both be clocked based on the signal clk1x, which may be a clock signal generated by memory controller 120 to have a frequency equal to the frequency of the DQS signal when it is active. Flip-flop 530 may receive dqs_pulse and flip-flop 532 may receive the output of flip-flop 530. Logic OR gate 534 may perform a logic OR operation on the output of flip-flops 530 and 532. The output of flip-flop 530, signal dqs_ts_1x_stg, may be driven for four memory clock cycles (clk1x) for strobe generation or eight memory clock cycles (clk1x) for back to back burst lengths of 8 bits. Flip-flops 530 and 532, along with OR gate 534, generally operate to extend the four cycle dqs_pulse signal, to five cycles.

The output of OR gate 534, dqs_ts_or, may be input to flip-flop 536, which may also be clocked by clk1x, to generate signal dqs_ts_or_1x. The signal dqs_ts_OR_1x may be a five cycle signal used to enable a pre-amble pulse. NAND gate 538 may be connected to receive dqs_ts_or_1x and clk1x. The output of NAND gate 538 may be input to NAND gate 540.

The signal dqs_ts_1x_stg may also be input to NAND gate 542 along with the inverted output of flip-flop 532. Inverter 544 may invert the output of flip-flop 532 and provide it to NAND gate 542. The output of NAND gate 542 may be input to flip-flop 546, which is clocked by clk2x. Clk2x may be a clock signal generated by memory controller 120 to have a frequency equal to twice the frequency of the DQS signal when it is active. Nand gate 542 along with flip-flop 546 may operate to generate a one cycle pulse (dqs_out_pre_pulse_p1), in such a way that its falling edge is a half cycle earlier than the output of Nand gate 538 (dqs_out_full_pulse). The output of flip-flop 546 may be input to NAND gate 540. Nand gate 540 generates the signal dqs_out_nand, which after flip-flops 550 and 552 may be a signal (dqs_out_2xb) extended a half cycle before the start of the preamble period, i.e., half cycle before drv_enable is asserted at strobe output pad 510.

The logic path through NAND gate 542, flip-flop 546, and NAND gate 540 may allow for the strobe signal to be held at a logical high half cycle before strobe tri-state is asserted at output pad 510. This design can potentially prevent glitches at strobe output pad 510 if the strobe tri-state on IO buffer 564 opens early with respect to the strobe data-path to IO buffer 564 during the start of a write preamble window. Signal dqs_out_nand, which was previously extended by half a cycle relative to tri-state at output pad 510, may be input to the series connected flip-flops 550 and 552. Flip-flops 550 and 552 may be clocked with clk2x. Similarly, the signal dqs_ts_or_1x may be input to the series connected flip-flops 554 and 556. Flip-flops 554 and 556 may also be clocked with clk2x. The output of flip-flop 556, labeled as signal dqs_ts_2xb, may be input to flip-flop 558, which is clocked with clk2x and drives the enable signals input to write data generation circuits 420. The signal dqs_ts_2xb, after a delay by delay chain 562, also controls the tri-state path of the strobe IO buffer at pad 510.

Delay chains 560 and 562 may be connected to the output of flip-flops 552 and 556, respectively. Delay chains 560 and 562 may each include one or more delay elements that introduce a delay into the signals output from flip-flops 552 and 556. The delays can be used to fine tune the timing of these signals. In one implementation, the period of the introduced delay may be set during manufacture of delay chains 560 and 562. In an alternative implementation, the delay period may be dynamically adjustable after manufacture of memory controller 120. For instance, a test procedure may be run in which multiple write operations are performed, using different delay periods, to determine an optimal delay amount that tends to maximize the stability of the written data.

A buffer 564, connected to the output of delay chain 560, may provide the DQS signal to pad 510. The output of delay chain 562 may serve as an enable signal, drv_enable, for buffer 564. Based on the signal drv_enable, the output of buffer 564 may either be tri-state, when drv_enable is set to disable buffer 564, or set to mirror the value of dqs_out_2xb, when drv_enable is set to enable buffer 564.

Figure 6:
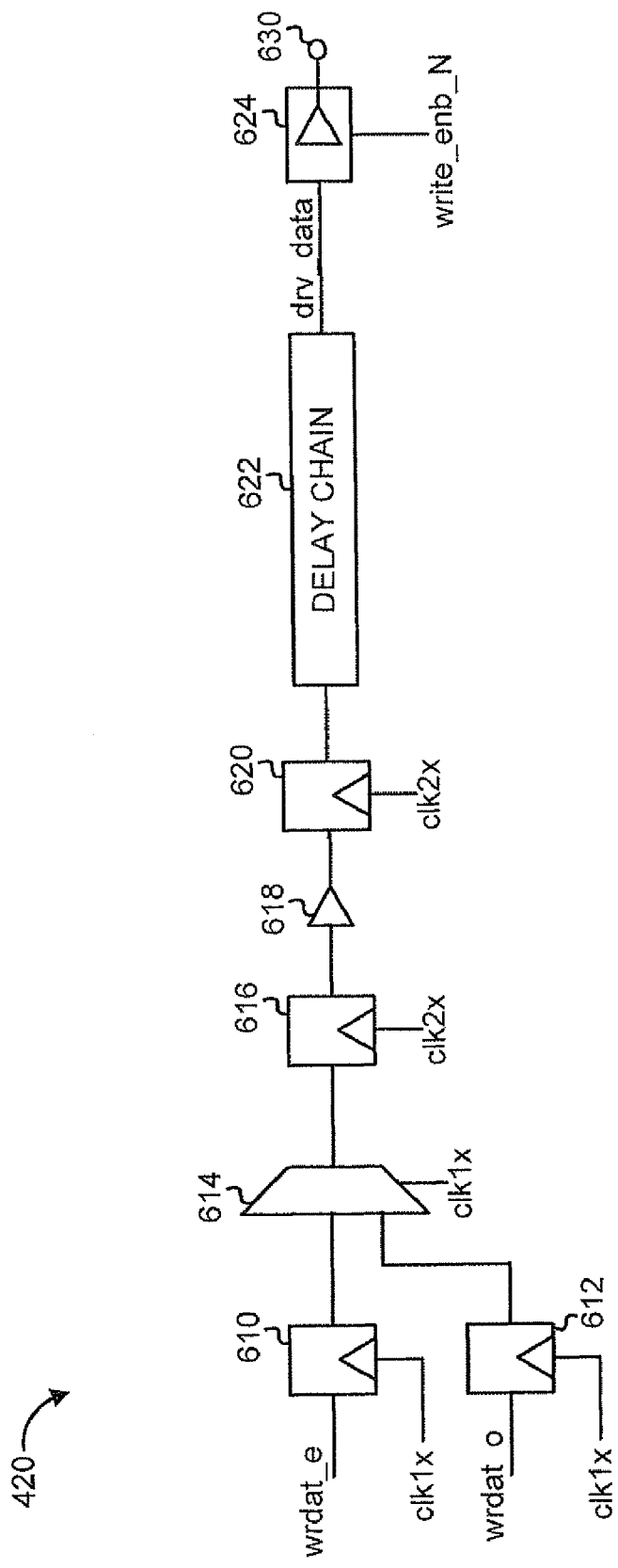
FIG. 6 is a diagram illustrating an exemplary implementation of one of the write data generation circuits shown in FIG. 4.

FIG. 6 is a diagram illustrating an exemplary implementation of one of write data generation circuits 420. Each of write data generation circuits 420 may source write data to one of the DQ data lines $DQ_0$ through $DQ_7$. Memory controller 120 may transmit data to write generation circuit 420 on a pair of data lines, labeled as wrdat_e and wrdat_o in FIG. 6. The data on wrdat_e and wrdat_o may correspond to bits in a write data burst that write data generation circuit 420 may alternate on its output DQ line. Thus, for an 8-bit write burst, the even bits (bits 0, 2, 4, and 6) may be received on wrdat_e and the odd bits (bits 1, 3, 5, and 7) may be received on wrdat_o.

Flip-flops 610 and 612 may receive wrdat_e and wrdat_o, respectively. Flip-flops 610 and 612 may each be clocked by clk1x. Multiplexer 614 may receive the outputs of flip-flops 610 and 612. The control line of multiplexer 614 may also be connected to clk1x, thus causing the outputs of flip-flops 610 and 612 to be alternately selected by multiplexer 614. The output of multiplexer 614 may be further input to flip-flop 616, followed by buffer 618 and then flip-flop 620. Flip flops 616 and 620 may be clocked by clk2x.

Delay chain 622 may be connected to the output of flip-flop 620. Delay chains 622 may include one or more delay elements that introduce a delay into the write signal output from flip-flop 620. The delay may be used to fine tune the timing of this signal. In one implementation, the period of the introduced delay may be set during manufacture of delay chain 622. In an alternative implementation, the delay period may be dynamically adjustable after manufacture of memory controller 120. For instance, a test procedure may be run in which multiple write operations are performed, using different delay periods, to determine an optimal delay amount that tends to maximize the stability of the written data.

A buffer 624, connected to the output of delay chain 622, may provide the DQ signal to pad 630. The enable signal from write DQS generation circuit 410, write_enb_N (i.e., one of write_enb_0 through write_enb_7) may serve as an enable signal for buffer 624. It can be appreciated that in FIGS. 5 and 6, the particular logic gates, flip-flops, or other elements are not limiting. Concepts consistent with those implemented by the circuits shown in FIGS. 5 and 6 may be implemented using additional or other logic elements.

Figure 7:
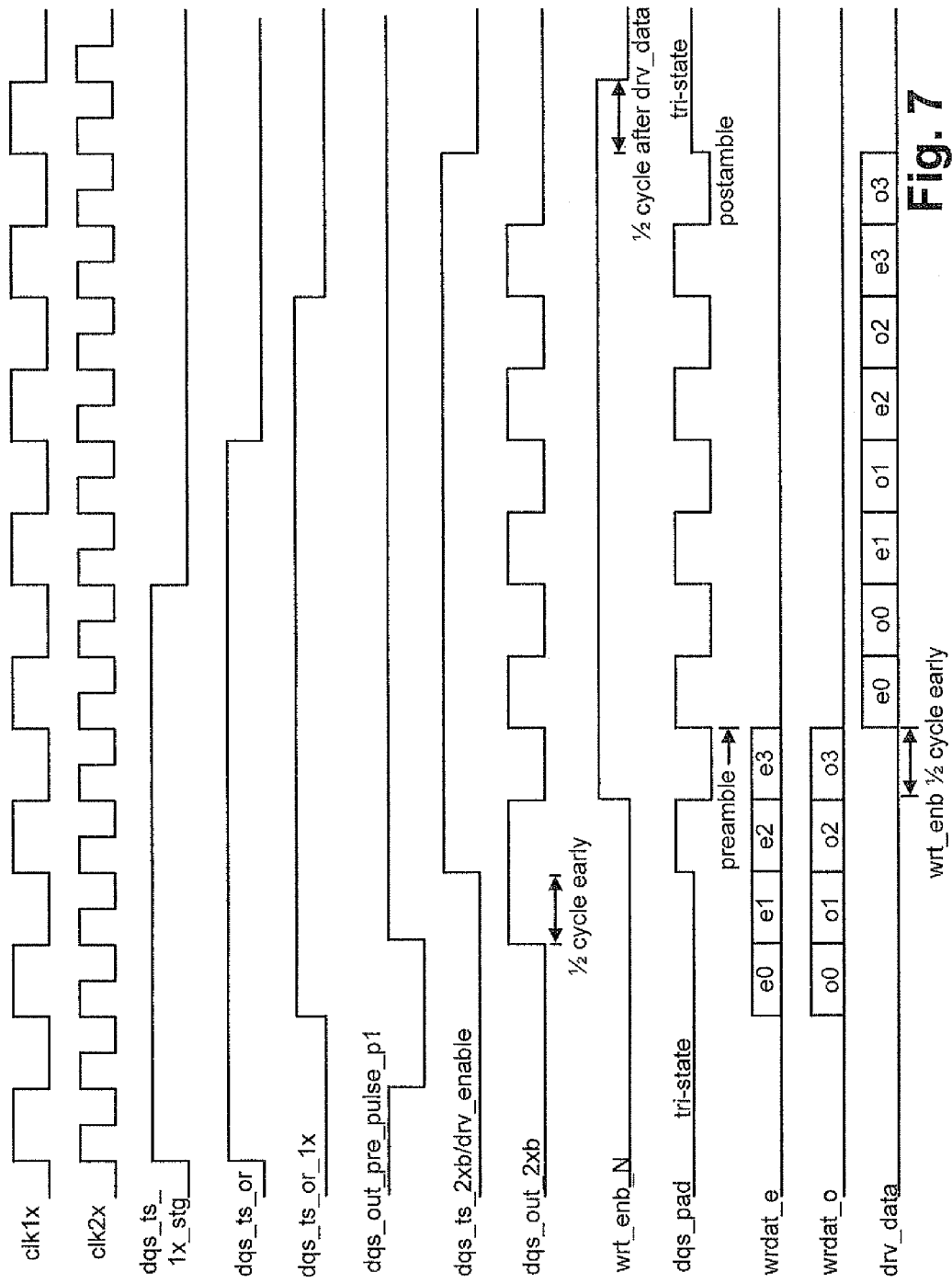
FIG. 7 is a timing diagram illustrating exemplary timing of signals.

FIG. 7 is a timing diagram illustrating exemplary timing of signals in system 100. As shown, signal clk1x is a clock signal that has a frequency equal to clock signal that is to be transmitted over the DQS line. Clk2x is a clock signal that has a frequency equal to twice that of clk1x. Both clk1x and clk2x may be generated by memory controller 120.

To begin a write operation, memory controller 120 may initially transmit a pulse to flip-flop 530, which may then drive signal dqs_ts_1x_stg high for four cycles of clk1x. Dqs_ts_or, the signal output by OR gate 534, is correspondingly also driven high. Because OR gate 534 receives a second input from flip-flop 532, which is delayed by one clock cycle, dqs_ts_or remains high for five cycles of clk1x. Signal dqs_ts_or_1x is a one clock cycle delayed version of dqs_ts_or. Signal dqs_ts_or_1x propagates through flip-flops 554 and 556 to generate signal dqs_ts_2xb, which is a one clock cycle delayed version of dqs_ts_or_1x. Signal dqs_out_pre_pulse_p1 is a signal in which the falling edge is a half cycle earlier than the signal output from Nand gate 538 (dqs_out_pulse_full).

Signal dqs_out_2xb, which is output from flip-flop 552, is generated by the combination of NAND gates 542, 538, and 540, and flip-flops 536, 546, 550, and 552. Signal dqs_out_2xb is similar to the eventual DQS signal that is output to pad 510, except that dqs_out_2xb is placed in logic high a half cycle early. The drv_enable signal then "opens" buffer 564 to begin propagating dqs_out_2xb as signal dqs_pad. Signal dqs_pad represents the DSQ signal that is transmitted to memory module 110. As shown, dqs_pad includes a preamble section, eight active rising and falling clock transitions, and a postamble section, after which the signal dry enable transitions to a logic low, placing dqs_pad back into tri-state.

Signal write_enb_N represents the timing for write_enb_0 through write_enb_7 to the respective write data generation circuits 420-0 through 420-7. Further, wrdat_e and wrdat_o represent timing of the data signals received by each of write data generation circuits 420. After processing by these circuits, the write data is serialized and output as drv_data. As is shown in FIG. 7, wrt_enb_N is enabled (driven logic high) one half cycle before data is generated at drv_data. Further, wrt_enb_N is held at logic high until one half cycle after data is written on drv_data.

The design for generating strobe and write signal data, as described above with reference to FIGS. 4-7, can prevent glitches at pad 510 if the strobe tristate to IO buffer 564 opens early with respect to strobe data during the start of a write preamble cycle. Further, as particularly shown in FIGS. 5 and 7, the drv_enable signal generated by write DQS generation circuit 410 opens the data line tri-state a half memory clock cycle early and closes it a half memory clock cycle late with respect to the data path to prevent valid data from being truncated. Additionally, the signal wrt_enb_N enables opening tristate to the data IO buffers 624 a half cycle early to prevent dvr_data, when valid, from getting truncated due to potential delays associated from turning on an IO driver from a tristate condition.

CONCLUSION

As described above, a write strobe generation circuit is described that may generate a glitch free strobe signal that is used for transmitting a data burst to a memory.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a memory configured to store data; and
a memory controller connected to the memory via a plurality of data lines, for writing a data burst as a plurality of data signals, and a strobe line, for transmitting a strobe signal used to control writing of the data signals to the memory, the memory controller including:
a plurality of write data generation circuits to each transmit one of the data signals on one of the data lines, the plurality of write data generation circuits being controlled by write enable signals, and
a write strobe generation circuit to generate the strobe signal and the write enable signals, the strobe signal including a preamble window to signal the beginning of the data burst, a data transfer window, and a postamble window to signal the end of the data burst, the write strobe generation circuit generating the write enable signals a half memory cycle early and terminating the write enable signals a half memory cycle late with respect to the data signals generated by the plurality of write data generation circuits,
where the write strobe generation circuit includes:
logic to generate a first signal that includes the preamble window, the data transfer window, and the postamble window,
a buffer to receive the first signal, and
logic to generate a drive enable signal that is input to the buffer, the drive enable signal controlling the buffer to source either a tri-state condition or the first signal to an output pad, where the output pad sources the strobe signal to the memory.

2. The device of claim 1, where each of the plurality of write data generation circuits receives data for the data burst on an input pair of the data lines.

3. A device comprising:
a memory configured to store data; and
a memory controller connected to the memory via a plurality of data lines, for writing a data burst as a plurality of data signals, and a strobe line, for transmitting a strobe signal used to control writing of the data signals to the memory, the memory controller including:
a plurality of write data generation circuits to each transmit one of the data signals on one of the data lines, the plurality of write data generation circuits being controlled by write enable signals, and
a write strobe generation circuit to generate the strobe signal and the write enable signals, the strobe signal including a preamble window to signal the beginning of the data burst, a data transfer window, and a postamble window to signal the end of the data burst, the write strobe generation circuit generating the write enable signals a half memory cycle early and terminating the write enable signals a half memory cycle late with respect to the data signals generated by the plurality of write data generation circuits, where the preamble window for the strobe signal is internally generated by the write strobe generation circuit a half cycle early with respect to a strobe signal output to the memory.

4. The device of claim 1, where the logic to generate the first signal of the write strobe generation circuit further includes:
 a pair of serially connected flip-flops that are clocked by a clock that has a frequency twice a write frequency for the memory; and
 a delay chain connected to receive output of the pair of serially connected flip-flops and to output the first signal.

5. The device of claim 4, where the logic to generate the drive enable signal of the write strobe generation circuit further includes:
 a second pair of serially connected flip-flops that are clocked by the clock; and
 a second delay chain connected to receive output of the second pair of serially connected flip-flops and to output the drive enable signal.

6. The device of claim 3, where the write strobe generation circuit further includes:
 first and second serially connected flip-flops to receive an input pulse signal;
 a logic OR gate connected to outputs of both of the first and second flip-flops;
 a third flip-flop connected to receive an output of the OR gate;
 a first logic NAND gate connected to receive an output of the OR gate and a clock signal;
 a second logic NAND gate connected to receive an output of the first flip-flop and to receive an inverted output of the second flip-flop;
 a fourth flip-flop connected to receive an output of the second logic NAND gate; and
 a third logic NAND gate connected to receive an output of the first logic NAND gate and an output of the fourth flip-flop.

7. A memory controller comprising:
 a plurality of write data generation circuits to each transmit a data signal to a memory device, each of the plurality of write data generation circuits being controlled by a write enable signal; and
 a write strobe generation circuit to transmit the write enable signal to the plurality of write data generation circuits and a strobe signal to the memory device, the strobe signal signaling when data from the data signal should be sampled by the memory device, the strobe signal including a preamble window to signal the beginning of a write data burst, a data transfer window, and a postamble window to signal the end of the write data burst, the write strobe generation circuit further including:
  logic to generate a first signal that includes the preamble window, the data transfer window, and the postamble window;
  a buffer to receive the first signal; and
  logic to generate a drive enable signal that is input to the buffer, the drive enable signal controlling the buffer to source either a tri-state condition or the first signal to an output pad, where the output pad sources the strobe signal to the memory device.

8. The memory controller of claim 7, where the logic to generate the first signal further includes:
 a pair of serially connected flip-flops that are clocked by a clock that has a frequency twice a write frequency for the memory device; and
 a delay chain connected to receive output of the pair of serially connected flip-flops and to output the first signal.

9. The memory controller of claim 8, where the logic to generate the drive enable signal further includes:
 a second pair of serially connected flip-flops that are clocked by the clock; and
 a second delay chain connected to receive output of the second pair of serially connected flip-flops and to output the drive enable signal.

10. The memory controller of claim 7, where the write strobe generation circuit further includes:
 first and second serially connected flip-flops to receive an input pulse signal;
 a logic OR gate connected to outputs of both of the first and second flip-flops;
 a third flip-flop connected to receive an output of the OR gate;
 a first logic NAND gate connected to receive an output of the OR gate and a clock signal;
 a second logic NAND gate connected to receive an output of the first flip-flop and to receive an inverted output of the second flip-flop;
 a fourth flip-flop connected to receive an output of the second logic NAND gate; and
 a third logic NAND gate connected to receive an output of the first logic NAND gate and an output of the fourth flip-flop.

11. The memory controller of claim 7, where the preamble window generated as part of the first signal begins a half cycle early relative to the strobe signal outputted by the output pad.

12. The memory controller of claim 7, where the write strobe generation circuit generates the write enable signal a half memory cycle early and terminates the write enable signal a half memory cycle late with respect to the data signal generated by the plurality of write data generation circuits.

13. A memory controller comprising:
 a plurality of write data generation circuits to each generate a data signal to a memory device, each of the plurality of write data generation circuits being controlled by a write enable signal; and
 a write strobe generation circuit to transmit a strobe signal to the memory device, the write strobe generation circuit further including:
  logic to generate a first signal that defines portions of the strobe signal,
  a buffer to receive the first signal, and
  logic to generate a drive enable signal that is input to the buffer, the drive enable signal controlling the buffer to source either a tri-state condition or the first signal to an output pad, where the output pad sources the strobe signal to the memory, and
  logic to generate the write enable signal for the plurality of write data generation circuits, where the logic to generate the write enable signal generates the write enable signal a half memory cycle early and terminates the write enable signals a half memory cycle late with respect to the data signals generated by the plurality of write data generation circuits.

14. The memory controller of claim 13, where the logic to generate the first signal further includes:
    a pair of serially connected flip-flops that are clocked by a clock that has a frequency twice a write frequency for the memory device; and
    a delay chain connected to receive output of the pair of serially connected flip-flops and to output the first signal.

15. The memory controller of claim 14, where the logic to generate the drive enable signal further includes:
    a second pair of serially connected flip-flops that are clocked by the clock; and
    a second delay chain connected to receive output of the second pair of serially connected flip-flops and to output the drive enable signal.

16. The memory controller of claim 13, where the write strobe generation circuit further includes:
    first and second serially connected flip-flops to receive an input pulse signal;
    a logic OR gate connected to outputs of both of the first and second flip-flops;
    a third flip-flop connected to receive an output of the OR gate;
    a first logic NAND gate connected to receive an output of the OR gate and a clock signal;
    a second logic NAND gate connected to receive an output of the first flip-flop and to receive an inverted output of the second flip-flop;
    a fourth flip-flop connected to receive an output of the second logic NAND gate; and
    a third logic NAND gate connected to receive an output of the first logic NAND gate and an output of the fourth flip-flop.

17. The memory controller of claim 13, where the strobe signal includes a preamble window to signal the beginning of a write data burst, and
    where the preamble window is generated as part of the first signal and begins a half cycle early relative to the strobe window outputted by the output pad.

* * * * *

UNITED STATES PATENT AND TRADEMARK OFFICE
CERTIFICATE OF CORRECTION

| | | |
|---|---|---|
| PATENT NO. | : 7,990,781 B1 | Page 1 of 1 |
| APPLICATION NO. | : 12/489770 | |
| DATED | : August 2, 2011 | |
| INVENTOR(S) | : Srinivas Venkataraman et al. | |

It is certified that error appears in the above-identified patent and that said Letters Patent is hereby corrected as shown below:

Column 9, line 9, claim 3, change the word "a" to read --the--.

Signed and Sealed this

Thirteenth Day of September, 2011

David J. Kappos
*Director of the United States Patent and Trademark Office*